United States Patent [19]

Shimizu et al.

[11] Patent Number: 4,709,931
[45] Date of Patent: Dec. 1, 1987

[54] SEAL FOR DAMPERS ON MOTOR VEHICLES

[75] Inventors: Keiichi Shimizu; Sanae Kikuchi; Hitoshi Nakano, all of Tochigi, Japan

[73] Assignee: Honda Giken Kogyo Kabushiki Kaisha, Tokyo, Japan

[21] Appl. No.: 872,161

[22] Filed: Jun. 9, 1986

[30] Foreign Application Priority Data

Jun. 13, 1985 [JP] Japan ................ 60-128645

[51] Int. Cl.$^4$ .......................... F16J 15/32
[52] U.S. Cl. ........................ 277/153; 277/12; 277/97
[58] Field of Search ........... 277/97, 133, 134, 152, 277/153, 12, 32

[56] References Cited

U.S. PATENT DOCUMENTS 2,186,537  1/1940  Salisbury ..................... 277/97
2,405,152  8/1946  Kilchenmann .............. 277/152 X
2,436,612  2/1948  Sheets ......................... 277/152 X
3,248,900  5/1966  Shurts ......................... 277/152 X
3,621,952  11/1971 Long et al. .................. 277/153 X
3,630,531  12/1971 Bondi ......................... 277/152 X

FOREIGN PATENT DOCUMENTS 2137289  10/1984  United Kingdom ........... 277/152

Primary Examiner—Robert S. Ward
Attorney, Agent, or Firm—Irving M. Weiner; Joseph P. Carrier; Pamela S. Burt

[57] ABSTRACT

A damper for use on a motor vehicle has a fluid cylinder, a piston axially slidable in the cylinder, and a piston rod secured to the piston. A seal incorporated in the damper includes an annular contacting portion held in contact with the outer peripheral surface of the piston rod and a resilient connecting portion having one end joined to the contacting portion and the other end secured to the inner peripheral surface of the cylinder. Due to the resiliency of the resilient connecting portion, the contacting portion is movable with the piston rod to a certain extent when the piston rod is moved with respect to the cylinder in a higher-frequency, smaller-amplitude range.

9 Claims, 5 Drawing Figures

SEAL FOR DAMPERS ON MOTOR VEHICLES

BACKGROUND OF THE INVENTION

1. Field of the Invention:

The present invention relates to a seal for a damper used in a motor vehicle suspension.

2. Description of the Relevant Art:

Dampers are widely used in suspensions on automobiles, motorcycles, and other motor vehicles for dampening shocks imposed from surface irregularities of a road on the motor vehicle while it is traveling on the road.

Various dampers for use in motor vehicle suspensions are known in the art. One principal damper construction comprises a cylinder connected to a motor vehicle body or a wheel axle and a piston rod movably disposed in the cylinder and connected to the wheel axle or the motor vehicle body. The piston rod is secured to a piston disposed in the cylinder and slidably held against the inner peripheral surface of the cylinder, the piston dividing the inner space of the cylinder into two oil chambers, for example. When the motor vehicle travels on a road, the piston and the cylinder are vertically moved with respect to each other as the wheel goes over road surface irregularities. The volumes of the oil chambers are caused to vary, forcing the oil to flow between the oil chambers through orifices defined in the piston. Since the orifices impose resistance to the flow of the oil therethrough, the relative movement of the piston rod and the cylinder is restricted to dampen shocks applied by the road to the motor vehicle body.

Inasmuch as the piston rod is displaced with respect to the cylinder, a seal is mounted in the cylinder at its open end in surrounding relation to the piston rod for preventing the oil from leaking out of the cylinder along the peripheral surface of the piston rod.

A typical seal is disclosed, for example, in U.S. Pat. No. 4,203,507 issued May 20, 1980 to Tomita et al. The patented seal comprises an annular elastomeric body of rubber or the like. The seal includes an outer attachment flange for attachment to a bushing or the like mounted in a cylinder and an inner contacting web for contact with a piston rod. A rigid reinforcing metal member is embedded in the attachment flange for allowing the seal to be securely attached to the bushing. The reinforcing metal member extends from one end of the attachment flange all the way to the other end thereof. The inner contacting web has a plurality of of lips on its inner peripheral surface, the lips being pressed against the outer peripheral surface of the piston rod by rings forcibly fitted over the outer peripheral surface of the inner contacting web.

When the damper is operated, the piston rod is displaced with respect to the cylinder and hence the seal at all times irrespective of the magnitude of shocks transmitted from road surface irregularities to the damper. Where road surface irregularities are smaller, the piston rod is displaced relatively to the cylinder through smaller strokes and more frequently.

It is known that when the piston rod is displaced relatively to the seal, a transient occurs from a static friction mode to a dynamic friction mode. If the piston rod stroke is smaller and more frequent, i.e., if the damper is in a higher-frequency, smaller-amplitude range, then the transient between the static and dynamic friction modes takes place many times within a short period of time. This causes the piston rod to stick to the cylinder, whereupon vibrations from the road surface are transmitted via the damper to the motor vehicle body, thus lowering the riding comfort.

SUMMARY OF THE INVENTION

It is an object of the present invention to provide a seal for a motor vehicle damper, capable of moving with small displacements of a piston rod with respect to the cylinder, so that the seal and the piston rod are held in a static friction mode when the damper operates in a higher-frequency, smaller-amplitude range.

According to the present invention, a seal is provided for use in a damper having a fluid cylinder, a piston axially slidable in the cylinder, and a piston rod secured to the piston, the seal comprising an annular contacting portion adapted to be held in contact with the outer peripheral surface of the piston rod and a resilient connecting portion having one end joined to the contacting portion and the other end adapted to be secured to the inner peripheral surface of the cylinder, the contacting portion being movable with the piston rod when the piston rod is moved with respect to the cylinder in a higher-frequency, smaller-amplitude range.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
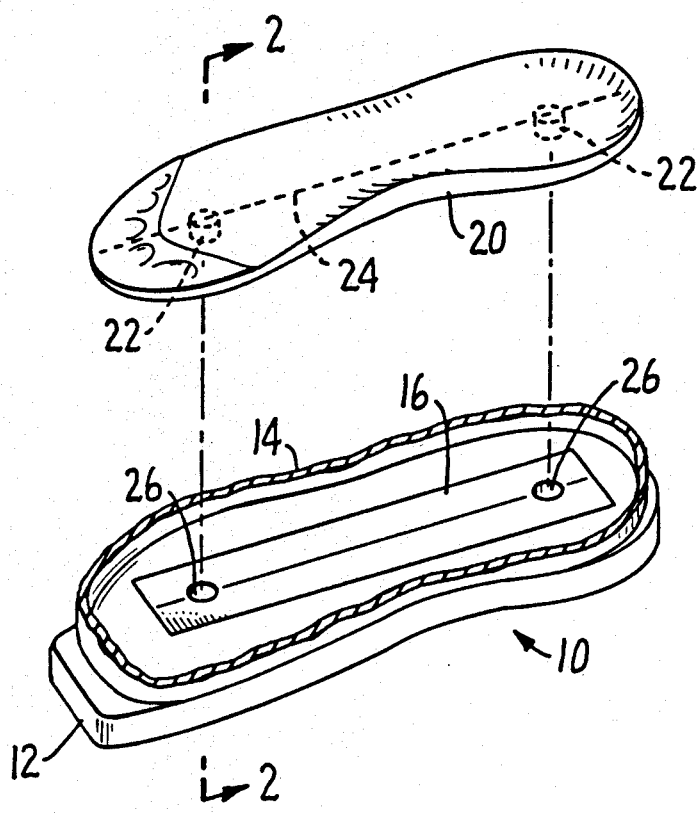
FIG. 1 is a longitudinal cross-sectional view of a damper incorporating a seal according to the present invention.

As shown in FIG. 1, a damper 1 for use on a motor vehicle includes an outer cylinder 2 and an inner cylinder 3 disposed coaxially in the outer cylinder in radially spaced relation thereto. The inner cylinder 3 is supported at its upper end by a guide rod 4 positioned in an upper end portion of the outer cylinder 2. The outer and inner cylinders 2, 3 define an oil reservoir chamber 5 therebetween. The outer cylinder 2 has a lower end connected to a wheel axle through a suspension arm (not shown).

A piston rod 6 extends through the guide rod 4 coaxially into the inner cylinder 3. The piston rod 6 is attached at its lower end to a piston 7. The piston 7 is slidably held against the inner peripheral surface of the inner cylinder 3, the piston 7 dividing the inner space of the inner cylinder 3 into two oil chambers Sl, S2. The oil chambers Sl, S2 are held in fluid communication with each other through orifices 7a defined axially through the piston 7.

The outer cylinder 2 has an upper end bent radially inwardly to form an annular stopper 8. A seal 10 according to the present invention is disposed between the annular stopper 8 and the rod guide 4 and positioned in contact with the outer peripheral surface of the piston rod 6 by a bushing 9 held against the inner peripheral surface of the outer cylinder 2. The rod guide 4 has an oil return passage 4a defined therethrough for allowing leaked oil to return from the seal 10 back into the oil reservoir chamber 5.

Figure 2:
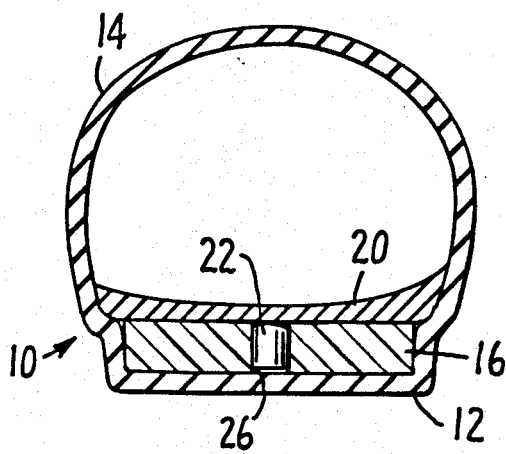
FIG. 2 is an enlarged cross-sectional view of the seal shown in FIG. 1.

The seal 10 is of an annular structure surrounding the piston rod 6. FIG. 2 shows the seal 10 in cross section on an enlarged scale. Although the seal 10 is shown only partly in FIG. 2, its illustrated axial cross-sectional shape remains the same throughout the seal 10 along the entire circumferential length thereof. The seal 10 generally comprises an outer attachment portion 11 for attachment to the bushing 9, an inner contacting portion 12 for contacting the outer peripheral surface of the piston rod 6, and a resilient connecting portion 13. The connecting portion 13 is in the form of a leaf spring, and has one end connected to the attachment portion 11 and the other end connected to the contacting portion 12. The outer attachment portion 11 comprises an elastomeric body 11a made of rubber or the like and a reinforcing metal member 11b embedded in the elastomeric body 11a. The inner contacting member 12 is made of an elastomeric material such as rubber and includes a plurality of lips 12a on its inner peripheral surface. The lips 12a are pressed against the outer peripheral surface of the piston rod 6 by rings 4 forcibly fitted over the outer peripheral surface of the inner contacting portion 12.

In operation, the piston rod 6 is displaced axially with respect to the cylinders 2, 3 as the wheels of the motor vehicle travel over road surface irregularities. Insofar as frictional forces produced between the piston rod 6 and the seal 10 are larger than the resilient forces of the leaf spring 13, the inner contacting portion 12 held against the piston rod 6 is displaced in unison with the piston rod 6. When the resilient forces of the leaf spring 13 exceed the frictional forces, the piston rod 6 starts sliding against the seal 10.

Figure 3:
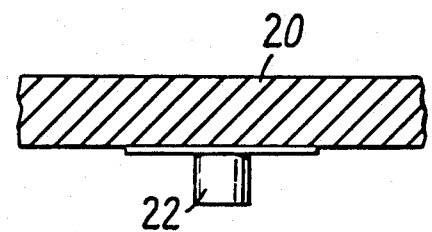
FIGS. 3 and 4 are enlarged cross-sectional views of seals according to other embodiments of the present invention.

FIG. 3 illustrates a seal according to another embodiment of the present invention. The seal shown in FIG. 3, generally denoted at 20, is of an annular unitary structure made of an elastomeric material such as rubber. The seal 20 includes an outer attachment portion 21 for attachment to the inner peripheral surface of the outer cylinder 2 and an inner contacting portion 22 for contacting the piston rod 6. The outer attachment portion 21 and the inner contacting portion 22 are integrally interconnected by a resilient connecting portion 23 which is normally spaced a gap S from the stopper 8 of the outer cylinder 2. In operation, the inner contacting portion 22 is displaced in unison with the piston rod 6 until the connecting portion 23 engages the stopper 8, or until the resilient forces of the connecting portion 23 become greater than the frictional forces between the piston rod 6 and the inner contacting portion 22.

Figure 4:
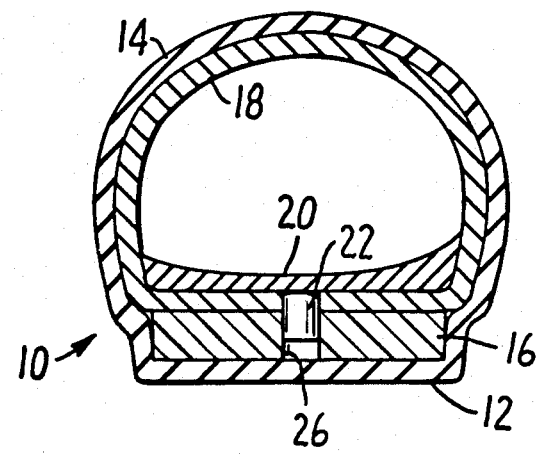
Figure 1:
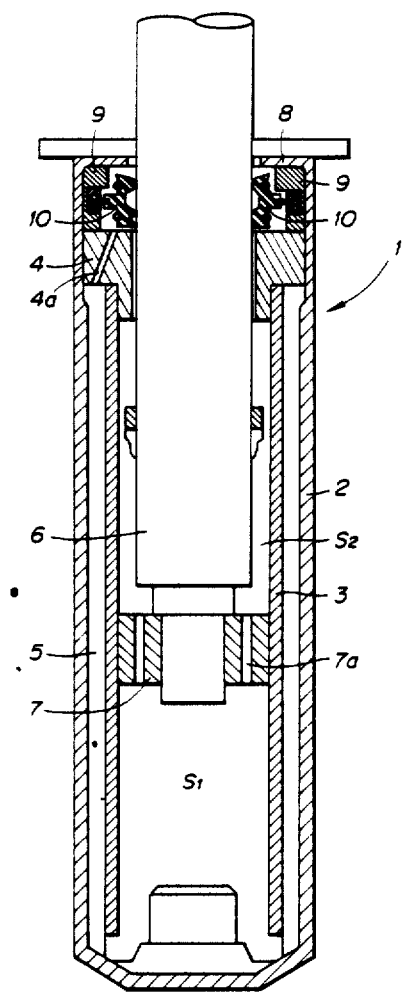
Figure 2:
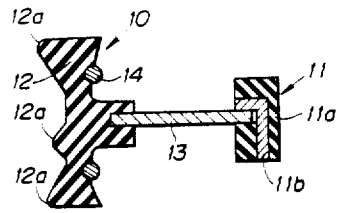
Figure 3:
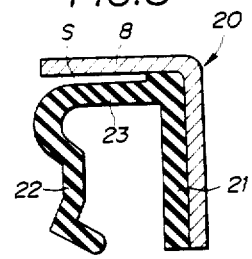
Figure 4:
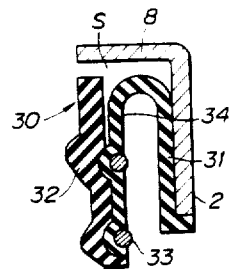

According to still another embodiment of the present invention, a seal 30 shown in FIG. 4 comprises an outer attachment portion 31, a resilient connecting portion 34 extending integrally from the outer attachment portion 31, and an inner contacting portion 32 which is separate from the resilient connecting portion 34. The outer attachment portion 31 and the resilient connecting portion 34, which are made of an elastomeric material, are of a unitary structure having an inverted U-shaped cross section. The outer attachment portion 31 is attached to the outer cylinder 2, whereas the resilient connecting portion 34 is held in abutment against the inner contacting portion 32, which is also made of an elastomeric material. Thus the resilient connecting portion 34 interconnects the outer attachment portion 31 and the inner contacting portion 32. The inner contacting portion 32 is pressed against the outer peripheral surface of the piston rod 6 by rings 33 forcibly fitted over the resilient connecting portion 34. The resilient connecting portion 34 and the inner contacting portion 32 are normally spaced a gap S from the stopper 8 of the outer cylinder 2. The inner contacting portion 32 can move with the piston rod 6 until the inner contacting portion 32 hits the stopper 8, or until the resilient forces of the outer attachment portion 31 exceed the frictional forces between the piston rod 6 and the inner contacting portion 32. The seal 30 of FIG. 4 is advantageous in that the outer attachment member 31 may be made of a material of better resiliency and the inner contacting member 32 may be made of a material of better sealing capability.

Figure 5:
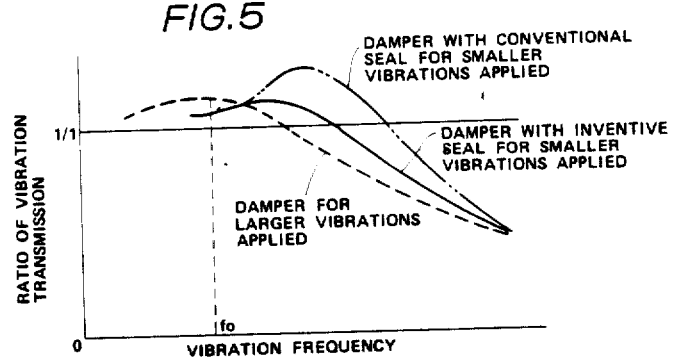
FIG. 5 is a graph showing characteristic curves of a damper with a seal of the invention and a damper with a conventional seal.

FIG. 5 shows ratios of vibration transmission, plotted against vibration frequencies, of a damper employing a seal of the invention and a damper employing a conventional seal. According to the present invention, when the piston rod of the damper is moved in the higher-frequency, smaller-amplitude range, no sliding movement occurs between the seal and the piston rod, and hence no transient takes place between the static and dynamic friction modes. Therefore, vibrations transmitted from the damper to the motor vehicle body in the higher-frequency, smaller-amplitude range are much smaller than those transmitted from the damper with the conventional seal in the same range. Rather, the ratio of vibration transmission in the higher-frequency, smaller-amplitude range for a seal according to the present invention is more analogous to that in a lower-frequency, larger-amlitude range. Therefore, motor vehicles equipped with dampers incorporating seals according to the present invention are capable of giving better riding comfort to passengers in the motor vehicles and of producing lower noise particularly when the dampers operate in the higher-frequency, smaller-amplitude range.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

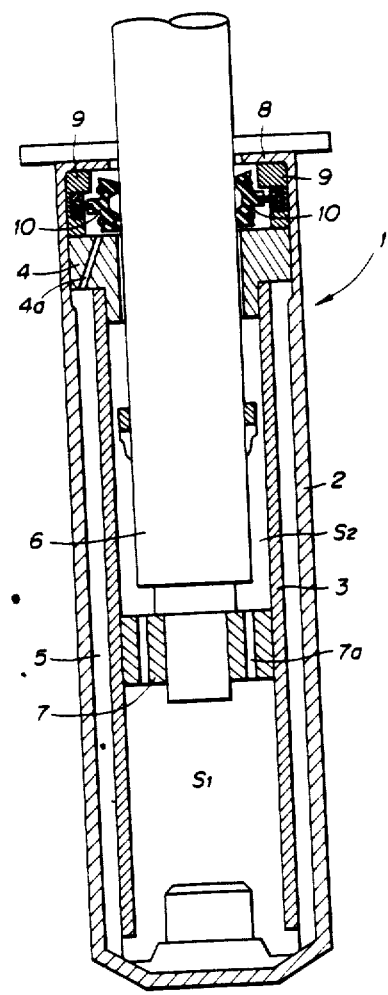

We claim:

1. A seal for use in a damper having a fluid cylinder, a piston axially slidable in the cylinder, and a piston rod secured to the piston, said seal comprising an annular contacting portion adapted to be held in contact with the outer peripheral surface of said piston rod and a resilient connecting portion having one end joined to said contacting portion and the other end adapted to be secured to the inner peripheral surface of said cylinder, said contacting portion being movable with said piston rod when the piston rod is moved with respect to said cylinder in a higher-frequency, smaller-amplitude range.

2. A seal according to claim 1, further comprising an attachment portion adapted to be attached to the inner peripheral surface of said cylinder, said other end of said connecting portion being joined to said attachment portion.

3. A seal according to claim 2, wherein said connecting portion is a leaf spring having one end joined to said contacting portion and the other end secured to said attachment portion.

4. A seal according to claim 2 wherein said connecting portion and said attachment portion being of a unitary structure.

5. A seal according to claim 4, wherein said connecting portion is adapted to be normally spaced a predetermined gap from an end of said cylinder, so that said conntacting portion may be displaced with the piston rod until said contacting portion engages said end of said cylinder.

6. A seal according to claim 4, wherein said connecting portion has such a degree of resiliency that said contacting portion may be displaced with the piston rod until resilient forces of said connecting portion become greater than frictional forces between the piston rod and the contacting portion.

7. A seal according to claim 2, wherein said contacting portion, said connecting portion, and said attachment portion being of a unitary structure.

8. A seal according to claim 7, wherein said connecting portion is adapted to be normally spaced a predetermined gap from an end of said cylinder, so that said contacting portion may be displaced with the piston rod until said contacting portion engages said end of said cylinder.

9. A seal according to claim 7, wherein said connecting portion has such a degree of resiliency that said contacting portion may be displaced with the piston rod until resilient forces of said connecting portion become greater than frictional forces between the piston rod and the contacting portion.

* * * * *

UNITED STATES PATENT AND TRADEMARK OFFICE
CERTIFICATE OF CORRECTION

PATENT NO.  : 4,709,931  
DATED       : December 1, 1987  
INVENTOR(S) : Shimizu et al.

Page 1 of 4

It is certified that error appears in the above-identified patent and that said Letters Patent is hereby corrected as shown below:

```
Column 1, line 49, after "plurality" delete "of"
(one occurrence).
Column 3, line 27, after "rings" change "4" to --14--.
Column 4, line 34, change "amlitude" to --amplitude--.
Column 5, line 6 (claim 4, line 2), change "being"
to --are--;
         line 11 (claim 5, line 4), change "conntacting"
to --contacting--.
Column 6, line 5 (claim 7, line 3), change "being" to
--are--.
```

The title page showing the illustrative figure should be deleted to appear as per attached page.
In the drawing the single sheet of drawing should be deleted to be replaced with two (2) sheets of drawing as shown on the attached sheets.

Signed and Sealed this

Sixteenth Day of August, 1988

*Attest:*

DONALD J. QUIGG

*Attesting Officer*       *Commissioner of Patents and Trademarks*

United States Patent [19]

Shimizu et al.

[11] Patent Number: 4,709,931

[45] Date of Patent: Dec. 1, 1987

[54] SEAL FOR DAMPERS ON MOTOR VEHICLES

[75] Inventors: Keiichi Shimizu; Sanae Kikuchi; Hitoshi Nakano, all of Tochigi, Japan

[73] Assignee: Honda Giken Kogyo Kabushiki Kaisha, Tokyo, Japan

[21] Appl. No.: 872,161

[22] Filed: Jun. 9, 1986

[30] Foreign Application Priority Data

Jun. 13, 1985 [JP] Japan ................... 60-128645

[51] Int. Cl.⁴ ........................................ F16J 15/32
[52] U.S. Cl. ............................... 277/153; 277/12; 277/97
[58] Field of Search ............... 277/97, 133, 134, 152, 277/153, 12, 32

[56] References Cited

U.S. PATENT DOCUMENTS

| 2,186,537 | 1/1940 | Salisbury | 277/97 |
| 2,405,152 | 8/1946 | Kilchenmann | 277/152 X |
| 2,436,612 | 2/1948 | Sheets | 277/152 X |
| 3,248,900 | 5/1966 | Shurts | 277/152 X |
| 3,621,952 | 11/1971 | Long et al. | 277/153 X |
| 3,630,531 | 12/1971 | Bondi | 277/152 X |

FOREIGN PATENT DOCUMENTS 2137289 10/1984 United Kingdom ................ 277/152

Primary Examiner—Robert S. Ward
Attorney, Agent, or Firm—Irving M. Weiner; Joseph P. Carrier; Pamela S. Burt

[57] ABSTRACT

A damper for use on a motor vehicle has a fluid cylinder, a piston axially slidable in the cylinder, and a piston rod secured to the piston. A seal incorporated in the damper includes an annular contacting portion held in contact with the outer peripheral surface of the piston rod and a resilient connecting portion having one end joined to the contacting portion and the other end secured to the inner peripheral surface of the cylinder. Due to the resiliency of the resilient connecting portion, the contacting portion is movable with the piston rod to a certain extent when the piston rod is moved with respect to the cylinder in a higher-frequency, smaller-amplitude range.

9 Claims, 5 Drawing Figures